Dec. 24, 1935.  E. SNEESBY  2,025,620
CONVEYER
Filed April 5, 1933
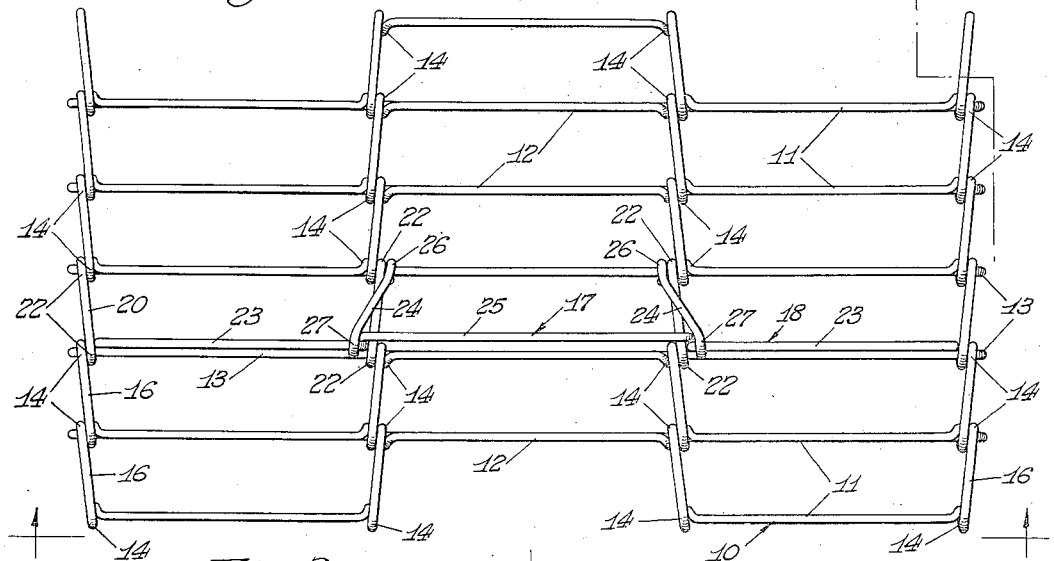
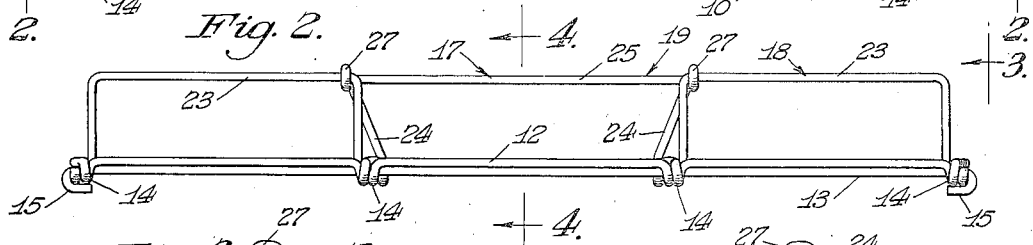
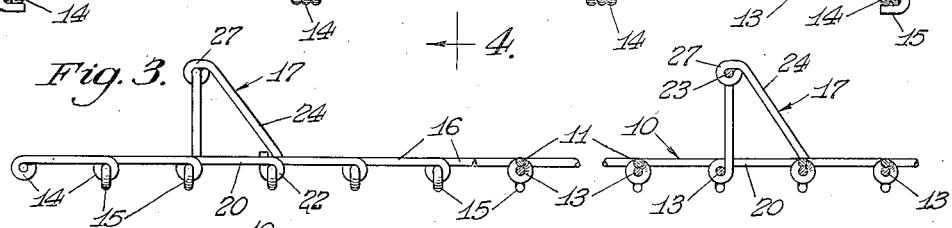
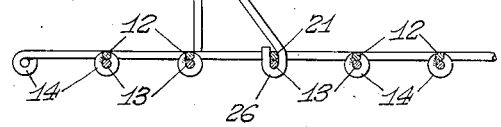
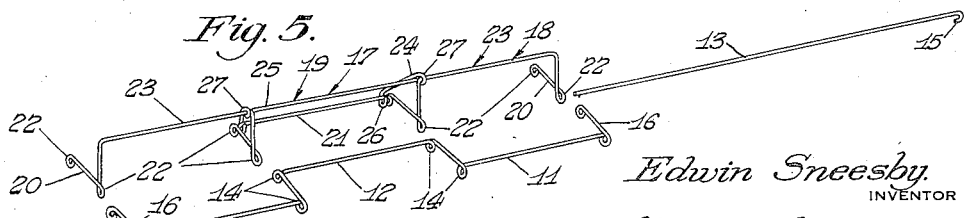
Edwin Sneesby,
INVENTOR
BY Victor J. Evans & Co.
HIS ATTORNEYS Patented Dec. 24, 1935

2,025,620

UNITED STATES PATENT OFFICE 2,025,620

CONVEYER

Edwin Sneesby, Waukegan, Ill.

Application April 5, 1933, Serial No. 664,652

9 Claims. (Cl. 198—193)

This invention relates to certain novel improvemeans in conveyers, and has for its principal object the provision of an improved construction of this character which will be highly efficient in use and economical in manufacture.

An object of this invention is to provide a new and improved flexible metal endless conveyer.

Another object of the invention is to provide a new flexible metal conveyer comprising a series of pivotally interconnected wire units and so to construct the said units that they may be readily inserted into and removed from the conveyer when so desired.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a top plan view of a section of the new conveyer;

Fig. 2 is an end elevational view on line 2—2 in Fig. 1;

Fig. 3 is a view on line 3—3 in Fig. 1, partly in end elevation and partly in section;

Fig. 4 is a sectional view on line 4—4 in Fig. 2; and

Fig. 5 is a perspective detached detail view of parts of the new conveyer.

A section of the new endless conveyer is shown in Fig. 1, and includes a series of individual units, each generally indicated at 10. Each of these units 10 consists of a pair of angularly formed wire links 11. Each link 11 includes a pair of parallel arms 16 that are formed in its end portions and each link has an offset portion 12 formed therein between its arms or end portions 16. Formed in each link 11 at the ends thereof and at the angles therein are loops 14 and in the assembled relation of the links these loops are registered. The two links 11 in each unit 10 are pivotally interconnected by a wire rod 13 that is slidably inserted through the registered loops 11; the rods 13 having their end portions 15 angled back upon themselves (Fig. 2) to insure their attachment to the two links 11 joined thereby and thus securing the two links 11 and the rod 13 of each unit 10 together in assembled relation in the conveyer.

To separate the links 11 in each unit, or to insert or remove a unit 10 from the conveyer, one of the angled end portions 15 of the corresponding rod 13 may be straightened out, whereupon the said rod 13 may be slidably removed from the registered loops 14 to separate the links 11 joined thereby. In this manner a link 11 may be readily inserted into or removed from the conveyer.

At intervals along the conveyer a carrier link is inserted into a preselected unit 10 in the conveyer in place of one of the links 11 of the said preselected unit; each of these carrier links being generally indicated at 17. The general plan of one of these carrier links and its assembly with a link 11 is shown in Fig. 5.

Each carrier link 17 is made from two pieces of wire, 18 and 19. The piece 18 has a pair of parallel arms or end portions 20 formed therein, that are similar to the end portions 16 in the links 11; and each carrier link piece 18 has an offset portion 21 formed therein between its ends, that is similar to the offset portions 12 in the links 11. Each of the carrier link pieces 18 has loops 22 formed at its ends and at the angles therein and in the assembled relation of the carrier these loops 22 are registered with the loops 14 in the adjacent links and are pivotally interconnected thereto by the rods 13.

Each carrier link piece 18 includes two lengths 23, which are formed between the arms 20 and the offset portions 21. These lengths 23 in each piece 18 are held in upright position, projecting above the common level of the carrier, so as to carry articles along with the conveyer, by the carrier link pieces 19. Each of these pieces 19 has a pair of substantially parallel arms or end portions 24 and these arms 24 have loops 26 formed at their ends. These loops 26 embrace the offset portion 21 of the carrier link piece 18 (Figs. 4 and 5). Each carrier link piece 19 also includes a portion 25 that extends between the substantially parallel arms or end portions 24 thereof. Loops 27 are formed in each carrier link piece 19 at the juncture of the arms 24 and the mid-portion 25 thereof and these loops 27 embrace the lengths 23 of the carrier link piece 18 (Figs. 2, 4 and 5).

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A metal conveyer comprising a series of flexibly interconnected units, each of said units including a pair of angularly formed wire links, each of said links being made of a single piece of wire and each link having loops formed at the ends thereof and at the angles therein, the said loops in each unit being registered in the assembled relation of said links, each unit including a wire rod slidably inserted through the said registered loops and when therein pivotally interconnecting the said pair of links in each unit, and the said conveyer including carrier links arranged at intervals therealong and pivotally interconnected therein, each of said carrier links having a portion upstanding from the conveyer, and a reach to brace the upstanding portion.

2. In a conveyer, a link comprising a piece of wire bent to provide a plurality of U-shaped loops lying in a common plane and a U-shaped loop lying in a different plane, and a bracing wire connected with said one U-shaped loop and with two U-shaped loops.

3. In a conveyer, a link comprising a piece of wire bent to provide a plurality of U-shaped loops lying in a common plane and a U-shaped loop lying in a different plane, said plurality of U-shaped loops constituting an abutment for articles carried by the conveyer, a bracing wire connecting the bight of said one U-shaped loop with the bights of said two U-shaped loops.

4. In a conveyer, a link comprising a piece of wire bent to provide a plurality of U-shaped loops lying in a common plane and a U-shaped loop lying in a different plane, said plurality of U-shaped loops constituting an abutment for articles carried by the conveyer, and a bracing wire connecting said one U-shaped loop with said two U-shaped loops.

5. In a conveyer, a link comprising a piece of wire bent to provide a plurality of U-shaped loops lying in a common plane and a U-shaped loop lying in a different plane, said one U-shaped loop constituting an abutment for articles carried by the conveyer, and a single wire bent to provide two bracing reaches connecting said one U-shaped loop with said two U-shaped loops.

6. A conveyer comprising a series of flexibly interconnected units, each unit comprising a piece of wire bent to provide small loops arranged to register with similar loops of an adjacent unit, a wire passing through said aligned loops for flexibly connecting the units together, some of said units comprising a plurality of U-shaped loops lying in a plane substantially at right angles to the conveyer surface, and bracing wires connecting said U-shaped loops with other portions of their respective units.

7. A conveyer comprising a series of flexibly interconnected units, each unit comprising a piece of wire bent to provide small loops arranged to register with similar loops of an adjacent unit, a wire passing through said aligned loops for flexibly connecting the units together, some of said units comprising a plurality of U-shaped loops lying in a plane substantially at right angles to the conveyer surface, and bracing wires connecting said U-shaped loops with other portions of their respective units, said bracing wires being arranged at an angle to the conveyer surface.

8. A conveyer comprising a plurality of links, each link comprising a piece of wire bent to provide reaches arranged in spaced, end to end relation and a spaced parallel reach, said wire being bent to provide small loops at the ends of said reaches, the loops of one link being arranged for alignment with the loops of an adjacent link, and a wire passing through each group of aligned loops for flexibly connecting the links together, said reaches being arranged to reenforce the conveyer with respect to lateral forces, said conveyer including links having U-shaped loops arranged at an angle to the conveyer surface, to provide abutments for articles carried by the conveyer.

9. A conveyer comprising a plurality of links, each link comprising a piece of wire bent to provide reaches arranged in spaced, end to end relation and a spaced parallel reach, said wire being bent to provide two arms positioned at an angle to the said reaches and small loops at the ends of said reaches and said arms, the loops of one link being arranged for alignment with the loops of an adjacent link, a wire passing through each group of aligned loops for flexibly connecting the links together, said last-named wire holding the aligned reaches in close end to end relation, said reaches reenforcing the conveyer with respect to lateral forces applied to the conveyer, said conveyer including wire links having U-shaped loops extending outwardly from the conveyer surface, and a bracing wire connecting each of said U-shaped loops with its respective link proper.

EDWIN SNEESBY.